(12) United States Patent
Chang

(10) Patent No.: US 12,479,777 B2
(45) Date of Patent: Nov. 25, 2025

(54) ANTIMICROBIAL CERAMIC TILE AND MANUFACTURING METHOD THEREOF

(71) Applicant: Chih-Sheng Chang, Taipei (TW)

(72) Inventor: Chih-Sheng Chang, Taipei (TW)

( * ) Notice: Subject to any disclaimer, the term of this patent is extended or adjusted under 35 U.S.C. 154(b) by 698 days.

(21) Appl. No.: 17/888,496

(22) Filed: Aug. 16, 2022

(65) Prior Publication Data

US 2023/0091820 A1    Mar. 23, 2023

(30) Foreign Application Priority Data

Sep. 17, 2021   (TW) .................................. 110134887

(51) Int. Cl.
| | | |
|---|---|---|
| *C04B 41/52* | (2006.01) | |
| *C04B 35/626* | (2006.01) | |
| *C04B 41/45* | (2006.01) | |
| *C04B 41/50* | (2006.01) | |
| *C04B 41/87* | (2006.01) | |
| *C04B 41/89* | (2006.01) | |
| *C04B 103/67* | (2006.01) | |

(52) U.S. Cl.
CPC ........ *C04B 41/522* (2013.01); *C04B 35/6261* (2013.01); *C04B 35/62635* (2013.01); *C04B 35/62655* (2013.01); *C04B 41/4539* (2013.01); *C04B 41/4578* (2013.01); *C04B 41/5049* (2013.01); *C04B 41/5075* (2013.01); *C04B 41/87* (2013.01); *C04B 41/89* (2013.01); *C04B 2103/67* (2013.01); *C04B 2235/3281* (2013.01); *C04B 2235/3284* (2013.01); *C04B 2235/606* (2013.01)

(58) Field of Classification Search
None
See application file for complete search history.

(56) References Cited

U.S. PATENT DOCUMENTS

2009/0104459 A1\*  4/2009  Campbell, Jr. ..... C04B 41/5041
427/372.2

FOREIGN PATENT DOCUMENTS

EP              2759524 A1 \*  7/2014  ............. C03C 10/00

OTHER PUBLICATIONS

Translation of CN-107056055-A, Ke (Year: 2017).\*
Translation of CN-111559869-A, He (Year: 2020).\*

\* cited by examiner

*Primary Examiner* — David Sample
(74) *Attorney, Agent, or Firm* — Leong C. Lei

(57) ABSTRACT

The present invention provides an antimicrobial ceramic tile and manufacturing method thereof. A manufacturing method of an antimicrobial ceramic tile comprises: grinding soils into slurries; drying the slurries into powders by hot air; pressing the powders into a green body through a molding machine; dotting or spraying or showering a glaze slurry on the surface of the green body to form an engobe; dotting the glaze slurry on the engobe to form a ground glaze; mixing a surface glaze and an antimicrobial material into an antimicrobial glaze in a weight ratio of 100:5~10; grinding water and the antimicrobial glaze into the antimicrobial glaze in a weight ratio of 5~6:4~5; and dotting antimicrobial glaze on the ground glaze; finally, rapidly firing the ceramic tile and the antimicrobial glaze into an antimicrobial ceramic tile.

9 Claims, 2 Drawing Sheets

ANTIMICROBIAL CERAMIC TILE AND MANUFACTURING METHOD THEREOF

(a) TECHNICAL FIELD OF THE INVENTION

The present invention relates to an antimicrobial ceramic tile and manufacturing method thereof. More particularly, it relates to an antimicrobial ceramic tile with antimicrobial and far infrared properties and manufacturing method thereof.

(b) DESCRIPTION OF THE PRIOR ART

If people want to have good living conditions, they need to prevent and effectively inhibit growth of bacteria in the surrounding environment. With the development of nanomaterials, nano photocatalyst particles with antimicrobial ability are widely used in daily necessities. Hydroxyl free radicals are generated by irradiating the photocatalyst with light, and the proteins of bacteria and viruses can be denatured by using the superoxidative ability of the hydroxyl free radicals, so as to achieve the effect of sterilization.

Because ceramic tiles have been trampled, touched and polluted by various dusts for a long time, the ceramic tiles inside and outside the house are full of bacteria or viruses. Therefore, the use of photocatalysts for antimicrobial and bacteriostatic methods has begun to be applied on ceramic tiles, so that ceramic tiles have antimicrobial properties. It can greatly help to disinfect and clean the environment by combining nanomaterials on the ceramic tiles. In today's era of coexistence with viruses, safe and hygienic spaces are needed for places with higher environmental hygiene requirements.

Nanomaterials currently used in the market require multiple steps of filtration, washing, evaporation, and decomposition to remove impurities generated during the manufacturing process. Secondly, the equipment is numerous due to the complicated manufacturing steps, the floor space is large, the cost is high, the entire manufacturing cycle is long, and the quality control stability is poor. In addition, the generated waste pollutes the environment; therefore, it increases the treatment cost and energy consumption.

In view of the prior art in this field, the authors of this invention have made an innovative breakthrough which overcomes the deficiencies of conventional delivery methods, and improves the actual regenerative material chemistry efficacy. This invention applies novel approaches which leverage technologies developed for lighting and communication fiber optics manufacture to bring vastly improved regenerative medical materials to the market, promote the development of the industry and improve the health of society.

SUMMARY OF THE INVENTION

The main purpose of the present invention is to provide an antimicrobial ceramic tile and manufacturing method thereof. The antimicrobial material used in the antimicrobial ceramic tile still has good antimicrobial ability and far infrared characteristics after firing at 1000~1600° C. in the ceramic glaze. Further, the antimicrobial material has a simple production process, low cost, pollution-free, and can be industrialized and automatically produced continuously, thereby achieving stable product quality.

To achieve the objectives above, the present invention provides an antimicrobial ceramic tile comprising a green body, an engobe layer on a surface of the green body, a ground glaze layer on the engobe layer, and an antimicrobial glaze layer on the ground glaze layer. First, an antimicrobial glaze material is formed by coaxing the surface glaze with the antimicrobial material in a weight ratio of 100:5~10. Then, water and the antimicrobial glaze are ground in a weight ratio of 5~6:4~5 to form an antimicrobial glaze, after then the specific gravity of the antimicrobial glaze is adjusted to 1.3~01.50. Finally, the antimicrobial glaze is dotted or sprayed or showered on the ground glaze layer to form the antimicrobial glaze layer.

In embodiments, the antimicrobial material is composed of coated nano zinc oxide powders, coated nano copper oxide powders, or a mixture of the coated nano zinc oxide powders and the nano copper oxide powders.

In embodiments, the coated nano zinc oxide powders of the antimicrobial material are formed by coating the nano zinc oxide powders with silica sol, and the coated nano copper oxide powders are formed by coating the nano copper oxide powders with sands.

In embodiments, an average particle size of the coated nano zinc oxide powders of the antimicrobial material are 8 to 12 nanometers, and a specific surface area is 70 to 130 $m^2/g$. Furthermore, an average particle size of the coated nano copper oxide powders are 30 to 35 nanometers, the specific surface area is 150 to 180 $m^2/g$, and fineness of the silica sol is 4 to 5 nm.

In embodiments, the antimicrobial rate of the antimicrobial ceramic tile against *Escherichia coli* is greater than 99.9%.

In embodiments, the antimicrobial rate of the antimicrobial ceramic tile against *Staphylococcus aureus* is greater than 99.9%.

To achieve the objectives above, the present invention provides a manufacturing method of an antimicrobial ceramic tile comprising: a step of forming a body of the ceramic tile, a step of forming an antimicrobial glaze and a step of firing. The step of forming the body of the ceramic tile comprises: grinding soils into slurries; drying the slurries into powders by hot air; and pressing the powders into a green body through a molding machine; dotting or spraying or showering a glaze sluny on the surface of the green body to form an engobe; and dotting or spraying or showering the glaze sluny on the engobe to form a ground glaze. Furthermore, a surface glaze and an antimicrobial material are mixed into an antimicrobial glaze in a weight ratio of 100:5~10; water and the antimicrobial glaze are ground into the antimicrobial glaze in a weight ratio of 5~6:4~5; and then antimicrobial glaze is dotted or sprayed or showered on the ground glaze Finally, the ceramic tile and the antimicrobial glaze are rapidly fired into an antimicrobial ceramic tile at a firing temperature.

In embodiments, the antimicrobial material is coated nano zinc oxide powders, coated nano copper oxide powders, or a mixture of the coated nano zinc oxide powders and the coated nano copper oxide powders in a weight ratio of 100:3 to 8.

In embodiments, manufacturing steps of the coated nano zinc oxide powders of the antimicrobial material are as follows. First, 6~10 g of zinc oxide powders are added to 100 ml of water at 85° C., and a magnetic stirrer is put into it to fully stir and mix to form a zinc oxide suspension solution. Then, the zinc oxide suspension solution is heated to 90~95° C., carbon dioxide gas is simultaneously fed into the zinc oxide suspension solution during the heating process, and the zinc oxide suspension solution is warmed for 3~5 hours to react fully when reaching 90~95° C. Furthermore, the carbon dioxide gas feeding is stopped and 8 g of silica sol is added to the zinc oxide suspension solution, and the zinc oxide suspension solution is warmed for 0.5 hours. Moreover, 3 g of an accelerating admixture is added for precipitation, the zinc oxide suspension solution is filtered after precipitation for 1~2 hours. Next, the zinc oxide suspension solution is dried at 200~250° C., and the zinc oxide suspension solution after drying is broken by a crusher. Finally, a calcination is carried out at 250~400° C. to obtain the coated nano zinc oxide powders.

In embodiments, manufacturing steps of coated nano copper oxide powders are as follows. First, copper sulfate solution and sodium hydroxide solution are mixed at a volume molar concentration ratio of 1:2. Then, the copper sulfate solution and the sodium hydroxide solution are input into a reactor at the flow rate of 1:1, and uniformly stirred and mixed to generate a light blue copper hydroxide precipitate and a reaction solution. Furthermore, the reaction solution is heated slowly to 50° C. to react fully until color of the solution changes from light blue to reddish brown, and finally becomes black, and the reactant solution is filtered to form a filter cake Finally, the filter cake is washed with clean water, and the filter cake is dried and pulverized to obtain the coated nano copper oxide powders.

In embodiments, the firing temperature is 1000~1600° C.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
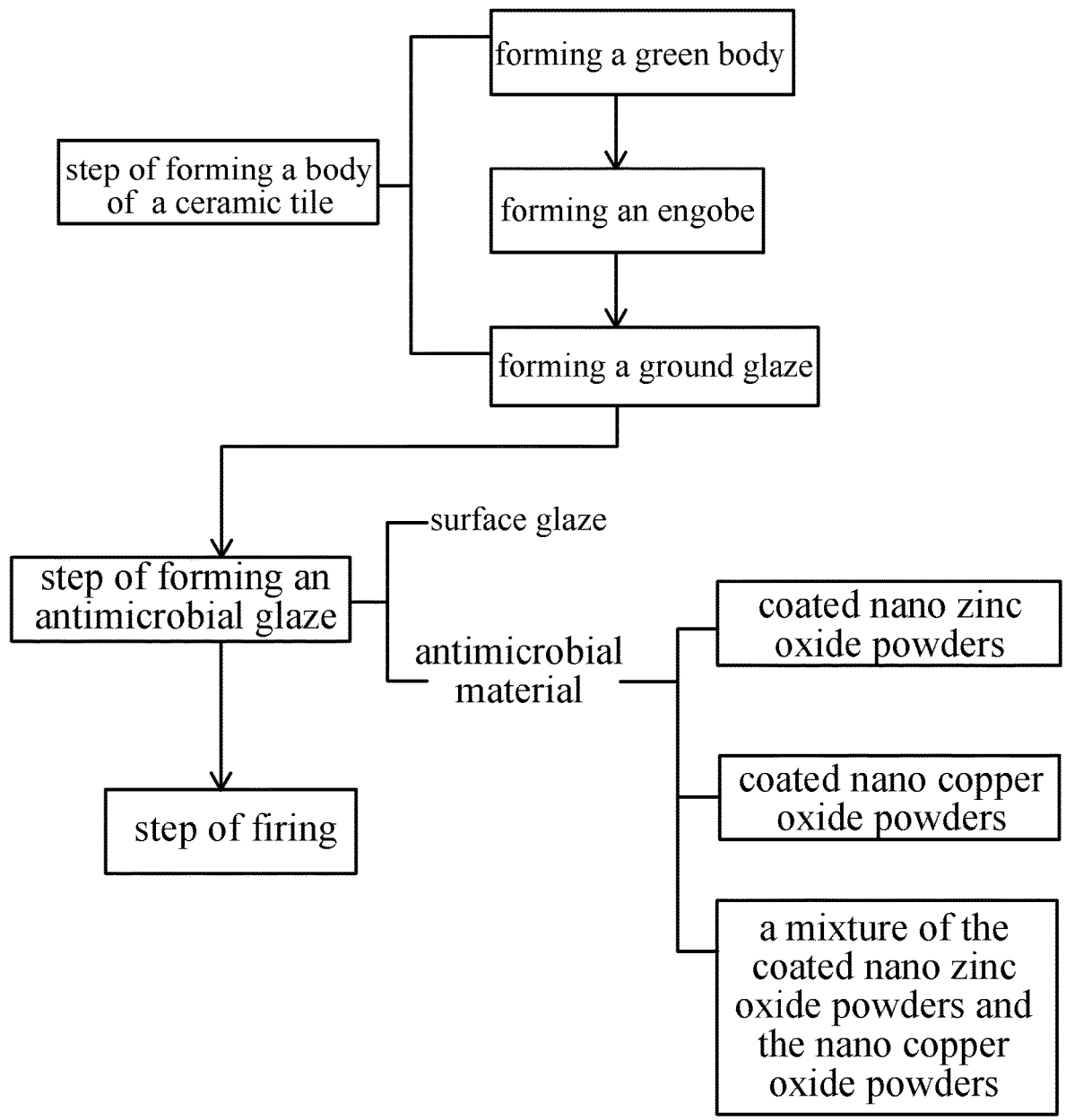
FIG. 1 is a flow chart of the manufacturing method of an antimicrobial ceramic tile according to the present invention.

Please refer to FIG. 1, FIG. 1 is a flow chart of the manufacturing method of an antimicrobial ceramic tile according to the present invention.

As shown in FIG. 1, the present invention provides a manufacturing method of an antimicrobial ceramic tile comprising: a step for forming a ceramic tile body, a step for forming an antimicrobial glaze and a step for firing. First, the step for forming a ceramic tile body comprises a step for forming a green body, a step for forming an engobe and a step for forming a ground glaze. Furthermore, soils ground into slurries, the slurries are dried into powders by hot air, and the powders are pressed into the green body through a molding machine. In addition, glaze slurries are dotted or sprayed or showered on the surface of the green body to form the engobe, and the glaze slurry is dotted or sprayed or showered on the engobe to form the ground glaze. More particularly, 20~30 wt % of clay, 60~70 wt % of feldspar and 5~10 wt % of sand are ground into the slurries, the slurries are ground in medium and high alumina ball stone for 10~11 hours, and the slurries are ground in French ball stone for 18~19 hours. The standard specific gravity of the test of the slurries is 1.72±0.02, the residue is 1.0 g±0.3 g and the viscosity is 300 cps±100 cps. When the test fails, it needs to be adjusted to pass before the slurries can be discharged. Furthermore, the slurries are pumped into a spray tower, and the mist is generated by high pressure; wherein the temperature in the spray tower is 570~650° C., and the slurries have a liquid moisture content of 32~35% and is instantaneously dried to 5.5~6.5% at a high temperature to produce granular particles, which are transported and stored in powder barrels. In addition, the powders are formed by high pressure of 300~400 kgf/cm$^2$, and the bending resistance of the green body is controlled at 12~20 kgf/cm$^2$, and then transported to a vertical drying oven for glazing Next, take a 20×20 cm ceramic tile as an example, the first layer is first applied on the engobe with a specific gravity of 1.50~1.60 and a glaze weight of 18 g~21 g, and the second layer is to apply a surface glaze with a specific gravity of 1.55~1.65 and a glaze weight of 18 g~21 g on the engobe.

Furthermore, in the step for forming an antimicrobial glaze, a surface glaze and an antimicrobial material are mixed into an antimicrobial glaze in a weight ratio of 100:5~10, and then water and the antimicrobial glaze are mixed with a weight ratio of 5~6:4~5 ground into the antimicrobial glaze, the specific gravity is adjusted to 1.30~1.50, and the antimicrobial glaze is dotted or sprayed or showered on a bottom glaze layer. In one embodiment, the weight of glaze of 8~12 g is applied on the semi-finished surface glaze in a 20×20 cm size to achieve the antimicrobial effect and then stored on the trolley to be fired in the kiln; wherein the antimicrobial material is composed of coated nano zinc oxide powders, coated nano copper oxide powders, or a mixture of the coated nano zinc oxide powders and the nano copper oxide powders. The manufacturing method for the coated nano zinc oxide powders comprises: adding 8 g of zinc oxide powders to 100 ml of water at 85° C., and putting a magnetic stirrer to fully stir and mix to form a zinc monoxide suspension solution. Next, the zinc oxide suspension solution is heated to 90~95° C., the saturated pure carbon dioxide gas is simultaneously fed in the zinc oxide suspension solution, and the zinc oxide suspension solution is incubated for 5 hours and make it fully react after reaching a set temperature. In addition, a small amount of 8 g accelerator precipitation is added in the zinc oxide suspension solution, and then the zinc oxide suspension solution is filtered after 2 hours of precipitation. Furthermore, the zinc oxide suspension solution is dried at 200~250° C.; the zinc oxide suspension solution is crushed by a crusher after drying; and then the zinc oxide suspension solution is calcined at 250~400° C. to obtain the antimicrobial material. Secondly, the manufacturing steps of the coated nano copper oxide powders comprises: dissolving 20 g of copper sulfate and 20 g of sodium hydroxide in 60 ml of water respectively; mixing the volumetric molar concentration ratio of copper sulfate solution with sodium hydroxide solution at 1:2; inputting the copper sulfate solution and the sodium hydroxide solution into a reactor according to the flow rate of 1:1, and stirring and mixing uniformly to generate a reactant solution and light blue copper hydroxide precipitate; heating slowly the reactant solution to 50° C., changing color of the reactant solution from light blue to reddish-brown, and finally became black; filtering the reactant solution to form a filter cake; washing the filter cake by clear water; and drying and pulverizing the filter cake to obtain coated nano copper oxide powders. In an embodiment, a mixture of the coated nano zinc oxide powders and the coated nano copper oxide powders in a weight ratio of 100:3~8 is used as an antimicrobial material; wherein the antimicrobial material is added into the reaction furnace and stirred uniformly, so that the coated nano zinc oxide generates a negative charge and the coated nano copper oxide generates a positive charge, and the coated nano zinc oxide and the coated nano copper oxide are uniformly stirred to make the coated nano zinc oxide copper ion material. Furthermore, the ceramic tile and an antimicrobial glaze are combined to sinter an antimicrobial ceramic tile at a firing temperature of 1000~1600° C.

In a preferred embodiment, the sintering temperature is between 1180° C.~1195° C., the operating speed of kiln is between 32~45 minutes, and the sintering curve is rapidly cooled from room temperature to 1180~1195° C. Finally, the finished product smooth firing of clay, glaze, inkjet, and antimicrobial glaze at the final temperature.

Figure 2:
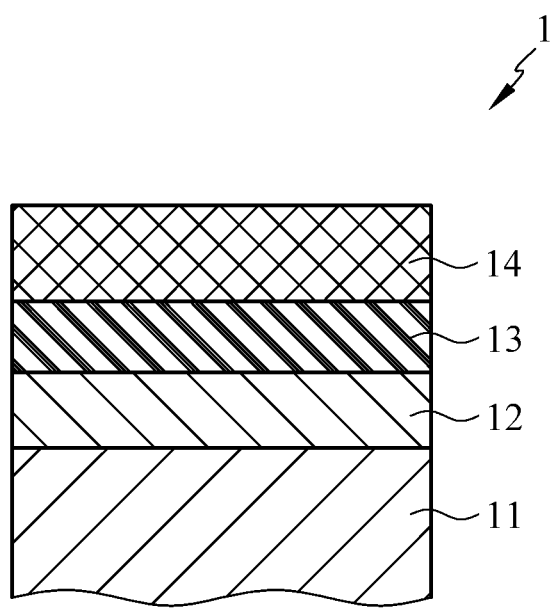
FIG. 2 is a sectional schematic view of the antimicrobial ceramic tile according to the present invention.

Please refer to FIG. 2, FIG. 2 is a sectional schematic view of the antimicrobial ceramic tile according to the present invention.

As shown in FIG. 2, the present invention provides an antimicrobial ceramic tile 1 manufactured by the above method comprising a green body 11, an engobe layer 12, a ground layer 13 and an antimicrobial glaze layer 14. The engobe layer 12 is on a surface of the green body 11, the ground layer 13 is on the engobe layer 12, and the antimicrobial glaze layer 14 is on the ground layer 13. Furthermore, a surface glaze with an antimicrobial material are mixed in a weight ratio of 100:5~10 to form an antimicrobial glaze, then water and the antimicrobial glaze are ground in a weight ratio of 5~6:4~5 to form an antimicrobial glaze, and the specific gravity of the antimicrobial glaze is adjusted to 1.30~1.50. Moreover, the antimicrobial glaze is dotted or sprayed or showered on the ground glaze layer to form the antimicrobial glaze layer 14. In an embodiment, the weight of glaze of 8~12 g is applied on the semi-finished surface glaze in a 20×20 cm size to achieve the antimicrobial effect and then stored on the trolley to be fired in the kiln. In addition, the antimicrobial material is composed of coated nano zinc oxide powders, coated nano copper oxide powders, or a mixture of the coated nano zinc oxide powders and the nano copper oxide powders; wherein the coated nano zinc oxide powders of the antimicrobial material is formed by coating the nano zinc oxide powders with silica sol, and the coated nano copper oxide powders are formed by coating the nano copper oxide powders with sands. The coating technology for coating nano copper oxide powders can achieve two effects. First, it is not easy to produce oxidation; secondly, because the nano copper oxide is a heavy metal, it is less dangerous and safer after coating. Furthermore, the nano copper oxide does not affect the release of copper ions after coating, because copper ions have oxidation and magnetic field force. In addition, the sand used in the coating technology has two advantages; wherein the first advantage is that the properties of the nano copper oxide are protected by the coating technology of sand, and the nano copper oxide will not deteriorate due to high temperature. General uncoated nano copper oxide will become cuprous oxide at a high temperature of about 1100° C. The second advantage is that it can prevent continued oxidation, and can also make the raw material more stable.

Due to the low solubility of zinc oxide in water, zinc ions slowly react with saturated carbon dioxide solution to form basic zinc carbonate precipitation with lower solubility. The above process is a dynamic process, zinc ions are continuously ionized, and basic zinc carbonate is continuously precipitated. The amount of zinc oxide, the unit amount of carbon dioxide gas, the proportion of water and the temperature control can adjust the particle size of basic zinc carbonate. The silica sol is added to perform a coating process to decompose excess water and carbonate by drying and calcining to obtain active coated nano zinc oxide powders. During the production process, nano zinc oxide will be piled up to form tight hexagons, each hexagon has a negative charge, and the hexagons collide with each other and run at high speed to generate heat, and then produce hydroxyls and super oxygen ions can be directly sterilized; and the coated nano zinc oxide has far infrared function because of 88~92 nanometer wavelength, which assists blood circulation of the human body. Furthermore, the positive charge copper ions of the coated nano copper oxide have stronger bactericidal power, and can directly attach to bacterial cells and virus protein films, and directly destroy their structure to achieve the effect of sterilization and detoxification. Due to the coating technology, the 24-hour sterilization rate can still reach more than 99.9% when the nano zinc oxide is fired in the glaze at 1000~1600° C., and the nano zinc oxide has far infrared function and the normal emissivity reaches 0.92.

The antimicrobial ceramic tile of the present invention is detected by the detection method of JIS Z 2801:210 Antimicrobial products-Test for antimicrobial activity and efficacy. The test results are shown in Table 1 below under the action time of 24 hours.

TABLE 1

Test results of antimicrobial ceramic tile

| Test organism | The average of the number of bacteria in the sample without antimicrobial material (CFU/cm$^2$) | The average of the logarithm of the number of bacteria in sample without antimicrobial material | The average of the number of bacteria in sample with antimicrobial material (CFU/cm$^2$) | The average of the logarithm of the number of bacteria in sample with antimicrobial material | The value of antimicrobial activity (R) |
|---|---|---|---|---|---|
| Escherichia coli | 4.0 × 10$^5$ | 5.60 | <1 | 0.00 | 5.60 |
| Staphylococcus aureus | 6.4 × 10$^4$ | 4.81 | <1 | 0.00 | 4.81 |

In Table 1, the value of antimicrobial activity (R)=[the average of the logarithm of the number of bacteria in sample without antimicrobial material—the average of the logarithm of the number of bacteria in sample with antimicrobial material], if the value of antimicrobial activity (R)≥2.0, it means there is antimicrobial effect.

The antimicrobial ceramic tile of the present invention is detected by the detection method of ISO 22196:2011 Plastic-Measurement of antimicrobial activity on plastics surfaces, and the test results are as follows in Table 2 and Table 3.

TABLE 2 antimicrobial ceramic tile test result table

| Test organism | Escherichia coli | (Escherichia coli) | ATCC 8739 |
|---|---|---|---|
| test group | number of bacteria (CFU/cm$^2$) | Log | The value of antimicrobial activity (R) |
| control group for 0 hours the number of bacteria ($U_0$) | $1.9 \times 10^4$ | 4.27 | 4.93 |
| control group for 24 hours the number of bacteria (Ut) | $6.9 \times 10^5$ | 5.83 | |
| sample group for 24 hours the number of bacteria (At) | 8.10 | 0.90 | |

TABLE 3 antimicrobial ceramic tile test result table

| Test organism | Staphylococcus aureus subsp. aureus | (Staphylococcus aureus subsp. aureus) | ATCC 6538P |
|---|---|---|---|
| test group | number of bacteria (CFU/cm$^2$) | Log | The value of antimicrobial activity (R) |
| control group for 0 hours the number of bacteria ($U_0$) | $1.0 \times 10^4$ | 4.00 | 3.05 |
| control group for 24 hours the number of bacteria (Ut) | $2.1 \times 10^3$ | 3.32 | |
| sample group for 24 hours the number of bacteria (At) | 1.90 | 0.27 | |

In Table 2 and Table 3, $U_0$: the number of bacteria tested immediately after inoculation of samples without antimicrobial material, which should be between $6.2 \times 10^3 \times 2.5 \times 10^4$ (CFU/cm$^2$); Ut: the number of bacteria of samples without antimicrobial material after 24 hours of incubation; At: the number of bacteria in sample with antimicrobial material after 24 hours of inoculation. The value of antimicrobial activity (R)=Ut−At, test of above test data is commissioned by SGS Food Laboratory Kaohsiung and SGS UTIS Taipei. Convert the value of antimicrobial activity into a percentage value by the following formula: [(Ut−At)/Ut]×100%, then the antimicrobial rate of *Escherichia coli* is: [($6.9 \times 10^5$−8.10)/$6.9 \times 10^5$]×100%=99.99; the antimicrobial rate of *Staphylococcus aureus* is: [($2.1 \times 10^3$−1.90)/$2.1 \times 10^3$]×100%=99.91.

As mentioned above, the antimicrobial ceramic tile of the present invention provides the coating technology, so that nano zinc oxide and nano copper oxide are in the situation of 1000~1600° C. of sintering in glaze, the sterilization rate still can reach 99.9% for 24 hours, and the antimicrobial ceramic tile has the function of far infrared and the normal emissivity reaches 0.92. Furthermore, the manufacturing method of the antimicrobial ceramic tile of the present invention is a simple production process, low cost, pollution-free, and can be industrialized and automatically produced continuously, thereby achieving stable product quality.

The foregoing description, for the purpose of explanation, has been described with reference to specific embodiments; however, the embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

I claim:

1. An antimicrobial ceramic tile, comprising:
    a green body;
    an engobe layer on a surface of the green body;
    a ground glaze layer on the engobe layer; and
    an antimicrobial glaze layer on the ground glaze layer;
    wherein an antimicrobial glaze material is formed by mixing a surface glaze with an antimicrobial material in a weight ratio of 100:5 to 10; and then, water and the antimicrobial glaze are ground in a weight ratio of 5 to 6:4 to 5 to form an antimicrobial glaze, after then the antimicrobial glaze is dotted or sprayed or showered on the ground glaze layer to form the antimicrobial glaze layer,
    the antibacterial agent is composed of coated nano zinc oxide powders, coated nano copper oxide powders, or a mixture of the coated nano zinc oxide powders and the nano copper oxide powders, and
    the coated nano zinc oxide powders are formed by coating the nano zinc oxide powders with silica sol.

2. The antimicrobial ceramic tile of claim 1, wherein the coated nano copper oxide powders are formed by coating the nano copper oxide powders with sands.

3. The antimicrobial ceramic tile of claim 1, wherein the antimicrobial rate of the antimicrobial ceramic tile against *Escherichia coli* is greater than 99.9%.

4. The antimicrobial ceramic tile of claim 1, wherein the antimicrobial rate of the antimicrobial ceramic tile against *Staphylococcus aureus* is greater than 99.9%.

5. The antimicrobial ceramic tile of claim 2, wherein an average particle size of the coated nano zinc oxide powders of the antimicrobial material is 8 to 12 nanometers, and the specific surface area is 70 to 130 m$^2$/g; and the average particle size of the coated nano copper oxide powders is 30 to 35 nanometers, and the specific surface area is 150 to 180 m$^2$/g.

6. A manufacturing method of an antimicrobial ceramic tile, comprising:
    a step of forming a body of the ceramic tile comprising:
        a step of forming a green body: grinding soils into slurries, drying the slurries into powders by hot air, and pressing the powders into the green body through a molding machine;
        a step of forming an engobe: dotting or spraying or showering a glaze slurry on the surface of the green body to form an engobe; and
        a step of forming a ground glaze: dotting or spraying or showering or ink jet printing or screen printing or roller printing the glaze slurry on the engobe to form the ground glaze;
    a step of forming an antimicrobial glaze: mixing a surface glaze and an antimicrobial material into an antimicrobial glaze in a weight ratio of 100:5 to 10; grinding water and the antimicrobial glaze in a weight ratio of 5 to 6:4 to 5; and then dotting or spraying or showering the antimicrobial glaze on the ground glaze; and a step of firing: firing rapidly the ceramic tile and the antimicrobial glaze into an antimicrobial ceramic tile at a firing temperature, wherein the antibacterial agent is composed of coated nano zinc oxide powders, coated nano copper oxide powders, or a mixture of the coated nano zinc oxide powders and the nano copper oxide powders, and the coated nano zinc oxide powders are formed by coating the nano zinc oxide powders with silica sol.

7. The manufacturing method of an antimicrobial ceramic tile of claim 5, wherein the antimicrobial material is a mixture of the coated nano zinc oxide powders and the coated nano copper oxide powders in a weight ratio of 100:3 to 8.

8. The manufacturing method of an antimicrobial ceramic tile of claim 6, wherein manufacturing steps of the coated nano antimicrobial material zinc oxide powders comprise:

adding 6 to 10 g of zinc oxide powders to 100 ml of water at 85° C., and putting a magnetic stirrer into it to fully stir and mix to form a zinc oxide suspension solution;

heating the zinc oxide suspension solution to 90 to 95° C., feeding simultaneously carbon dioxide gas into the zinc oxide suspension solution during the heating process, and warming the zinc oxide suspension solution for 3 to 5 hours to react fully when reaching 90 to 95° C.;

stopping feeding the carbon dioxide gas and adding 8 g of silica sol to the zinc oxide suspension solution, and warming the zinc oxide suspension solution for 0.5 hours;

adding 3 g of an accelerating admixture for precipitation for 1 to 2 hours, filtering the zinc oxide suspension solution after precipitation;

drying the zinc oxide suspension solution at 200 to 250° C., and breaking the zinc oxide suspension solution after drying by a crusher; and carrying out a calcination at 250 to 400° C. to obtain the coated nano zinc oxide powders.

9. The manufacturing method of an antimicrobial ceramic tile of claim 6, wherein manufacturing steps of coated nano copper oxide powders comprise:

mixing copper sulfate solution and sodium hydroxide solution at a volume molar concentration ratio of 1:2;

inputting the copper sulfate solution and the sodium hydroxide solution into a reactor at the flow rate of 1:1, and uniformly stirring and mixing to generate a light blue copper hydroxide precipitate and a reaction solution;

heating the reaction solution to 50° C. to react fully until color of the solution changes from light blue to reddish brown, and finally becoming black, and filtering the reactant solution to form a filter cake;

washing the filter cake with clean water, and drying and pulverizing the filter cake to obtain the coated nano copper oxide powders.

* * * * *